Nov. 29, 1966 W. C. TOWLE 3,289,172

DATA PROCESSING

Filed Dec. 21, 1962 4 Sheets-Sheet 1

INVENTOR.
WILLIAM C. TOWLE

BY [signature]

ATTORNEY

POSSIBLE INITIAL CONTENTS OF REARRANGER ($t_1$ ---- $t_{16}$)

| | | | | | | | | | | | | | | | | |
|---|---|---|---|---|---|---|---|---|---|---|---|---|---|---|---|---|
| A- | a | d | p | m | b | h | o | i | c | l | n | e | f | g | k | j |
| B- | d | p | m | a | h | o | i | b | l | n | e | c | g | k | j | f |
| C- | p | m | a | d | o | i | b | h | n | e | c | l | k | j | f | g |
| D- | m | a | d | p | i | b | h | o | e | c | l | n | j | f | g | k |

Fig. 3c

| | | | | |
|---|---|---|---|---|
| A- | 0 | 1 | 1 | 0 |
| B- | 0 | 0 | 1 | 1 |
| C- | 1 | 0 | 0 | 1 |
| D- | 1 | 1 | 0 | 0 |

Fig. 3d

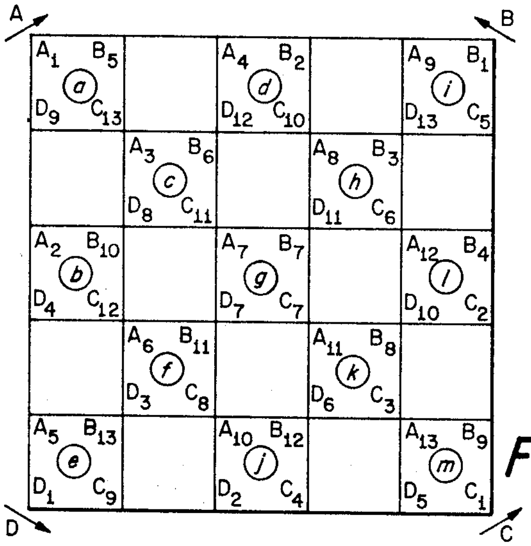

Fig. 4a

Fig. 4b

POSSIBLE SCAN SEQUENCES ($t_1$ ---- $t_{13}$)

| | | | | | | | | | | | | | |
|---|---|---|---|---|---|---|---|---|---|---|---|---|---|
| A- | a | b | c | d | e | f | g | h | i | j | k | l | m |
| B- | i | d | h | l | a | c | g | k | m | b | f | j | e |
| C- | m | l | k | j | i | h | g | f | e | d | c | b | a |
| D- | e | j | f | b | m | k | g | c | a | l | h | d | i |

Fig. 4c

POSSIBLE INITIAL CONTENTS OF REARRANGER

| | | | | | | | | | | | | | |
|---|---|---|---|---|---|---|---|---|---|---|---|---|---|
| A- | a | i | m | e | b | d | l | j | c | h | k | f | g |
| B- | i | m | e | a | d | l | j | b | h | k | f | c | g |
| C- | m | e | a | i | l | j | b | d | k | f | c | h | g |
| D- | e | a | i | m | j | b | d | l | f | c | h | k | g |

Fig. 5c

POSSIBLE INITIAL CONTENTS OF REARRANGER

| | | | | | | | | | | |
|---|---|---|---|---|---|---|---|---|---|---|
| A- | a | j | g | b | f | h | c | i | d | e |
| B- | j | g | a | f | h | b | i | d | c | e |
| C- | g | a | j | h | b | f | d | c | i | e |

POSSIBLE SCAN SEQUENCES ($t_1$ ---- $t_{10}$)

| | | | | | | | | | | |
|---|---|---|---|---|---|---|---|---|---|---|
| A- | a | b | c | d | e | f | g | h | i | j |
| B- | j | f | i | c | e | h | a | b | d | g |
| C- | g | h | d | i | e | b | j | f | c | a |

Fig. 5b

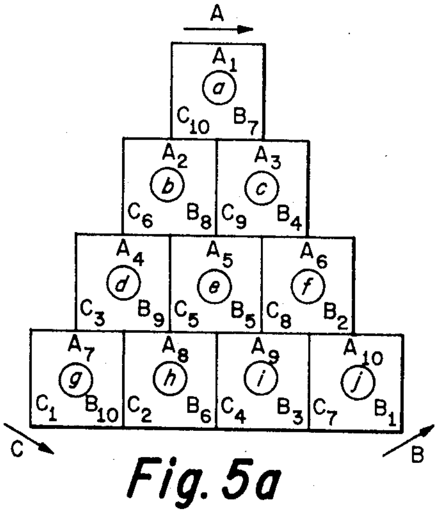

Fig. 5a

INVENTOR.
WILLIAM C. TOWLE
BY F. D. Sullivan
ATTORNEY

INVENTOR.
WILLIAM C. TOWLE
BY F. D. Sullivan
ATTORNEY

INVENTOR.
WILLIAM C. TOWLE

BY F. J. Sullivan

ATTORNEY

United States Patent Office 3,289,172
Patented Nov. 29, 1966

3,289,172
DATA PROCESSING

William C. Towle, Sudbury, Mass., assignor to Sylvania Electric Products Inc., a corporation of Delaware
Filed Dec. 21, 1962, Ser. No. 246,596
11 Claims. (Cl. 340—172.5)

This invention is concerned with data processing systems, and particularly with mark sensing equipment and the arrangement of data transduced by the scanners of such equipments. The present application is a continuation-in-part of U.S. patent application, Serial No. 838,480, filed September 8, 1959, now abandoned.

In many data processing systems such as record keeping, sales recording, etc., an information input technique is employed wherein data represented in a binary code by the presence or absence of marks, holes or other indicia is read from punched cards, fluoroscent or magnetic ink coded documents, etc. When the input data content is extensive or complex, the coded information is frequently arranged in rows and columns on the medium which is scanned by the input reading equipment. This means that the scanner must read the various rows and columns in proper sequence and direction to prevent confusion.

In the systems where the items scanned are brought into direct contact with the reader, it is generally possible to provide a mechanical arrangement of mating notches and projections or other types of irregularities so that the encoded object can be fitted to the reader in only one orientation with respect to the scanner's reading direction. For example, the cards of some office record systems have one beveled corner so that they can be properly fitted to the card readers. When, however, the scanner is not brought into immediate contact with the scanned item, orientation of the reading direction of the scanner and the rows and columns of the coded information field must somehow be reconciled with each other.

A primary object of the present invention is to provide mark sensing equipment wherein a scanning reader and a coded information field may cooperate in several different orientations with respect to one another. Another object is to provide an improved data processing system.

These and related objects are accomplished, in one embodiment of the invention, by providing a scanning system with a data rearranger which is comprised of a plurality of parallel operating shift registers and specialized control circuit connections. The coding of the items scanned is so organized that one particular group of code marks serve as control bits which provide a given sequence of information only when they are read in the proper direction. In the operation of the system the output of the scanning reader is divided into subgroups, one of which is comprised of these control bits and the others of which are specially organized in a manner which will be explained in more detail below. By shifting the contents of the register which contains the control bits until they are in the desired sequence and simultaneously shifting the contents of the other registers, the entire signal output from the scanner is suitably arranged in proper sequence for the decoding and output devices of the system.

Other objects of the invention and various embodiments and modifications thereof will be apparent from a further explanation of this mark sensing system which will be described with reference to the accompanying drawings, wherein:

FIG. 3C is a schedule of how the information sequences of FIG. 3B may be found in the rearranger of FIG. 2;

FIG. 3D is a diagrammatic representation of different possible arrangements of control bits according to the various scans possible for the information field of FIG. 3A;

FIGS. 4A–4C and FIGS. 5A–5C are diagrams and schedules corresponding to those of FIGS. 3A–3D for alternative types of information fields and directions of scan;

Figure 1:
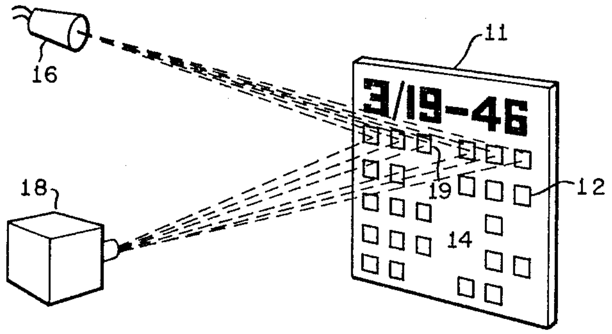
FIG. 1 is a diagrammatic representation of a coded document under scan.

In FIG. 1, a label 11 is shown with the information 3/19—46 (three for nineteen cents—department forty-six) in Arbaic numerals and in a binary coded information area. This area is comprised of a plurality of code marks 12 arranged in horizontal rows and vertical columns. Copending U.S. patent application S.N. 787,757, of January 19, 1959, describes how the marks 12 may consist of holes punched through a fluorescent background material 14. When the label is irradiated by energy from an ultra-violet strobe light 16, its image may be focused upon the face of a vidicon pick-up tube in a scanner 18. This particular type of mark sensing or scanning technique is not critical to the invention and is suggested merely for illustrative purposes to demonstrate one means whereby a series of rows and columns or other patterns of coded information may be transduced to electrical signals by a scanning device. For example, the scanner 18 of the system of FIG. 2 could, alternatively, be a flying spot device or any other type of equipment capable of reading the marks of a coded information field and converting them to a sequence of signals for input to a data processing system.

Figure 2:
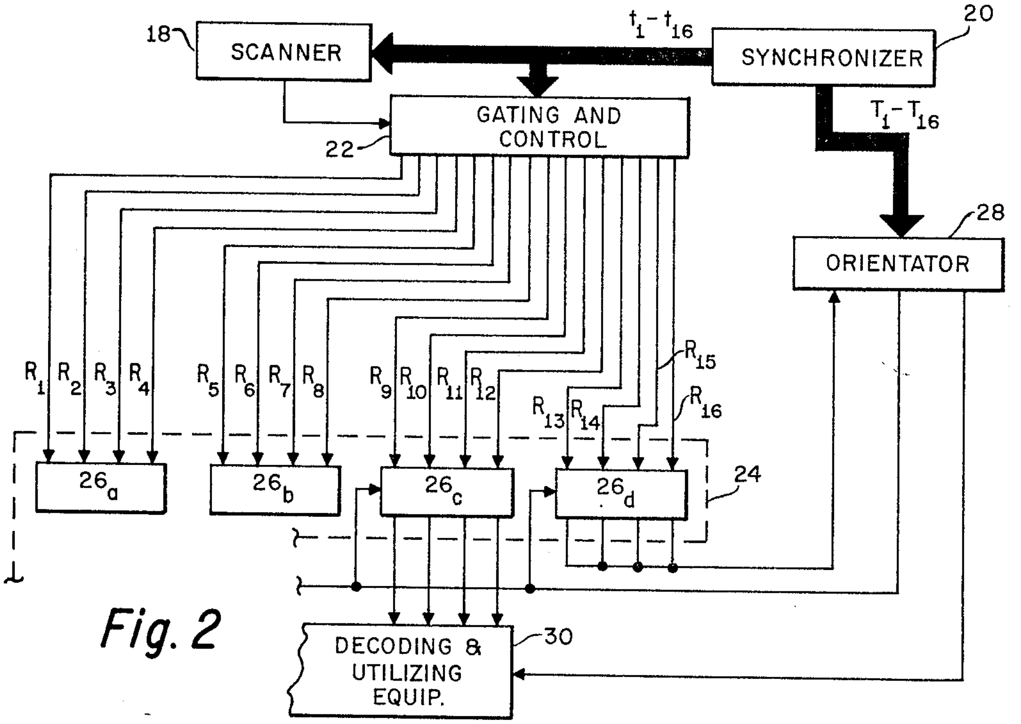
FIG. 2 is a block diagram of a data processing rearranger embodying the invention.

The system of FIG. 2 includes in addition to the scanner 18: a synchronizer 20; a gating and control network 22; a rearranger 24, including a plurality of parallel operating multistage shift registers 26, each having a feedback connection (not shown) from its final to its initial stage; an orientator 28; and, decoding and utilizing or output equipment 30. It is operable to permit the information field 32 of FIG. 3A to be scanned in any one of the four directions A–D because it rearranges the data output of the scanner in such a manner that the end use equipment 30 always receives it in the proper sequence.

In brief, this is accomplished by arranging the gating and control network 22 so that it connects the scanner 18 to different stages of the different shift registers in a difinite patterned sequence which results in the signal output of the scanner being divided into a number of separate groups corresponding to the separate registers.

One of these groups has a specialized signal content established by predetermined coding of the information field which provides a definite sequence of "control bits"

only when the transduced data is either initially read in the proper direction or later arranged to the proper sequence.

Achievement of this sequence is recognized by analyzing the contents of the shift register which contains the control bit group and shifting the contents of all of the registers in parallel until the proper sequence of control bits is obtained, whereupon the entire contents of the rearranger 24 is in proper order for the decoding and output equipment 30. Exactly how this is accomplished will be better understood after an explanation of the coding and various scanning sequences for the information field 32.

Figure 3A:
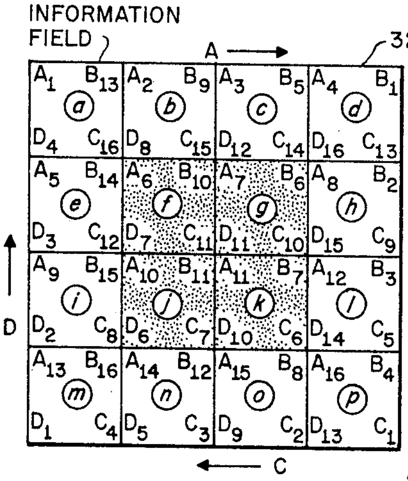
FIG. 3A is a diagrammatic representation of the information field of a coded item and the sequence in which the different code marks are read in different orientations of the scanned item and the scanning reader.

The illustrative coded area 32 shown in FIG. 3A is comprised of a 4 x 4 matrix containing sixteen bits of information *a–p*. These information bits may be fluorescent or magnetic markings against a relatively insensitive background, opaque areas against a fluorescent or phosphorescent background, or any suitable device for indicating by the presence or absence of a mark in the area (*a–p*) assigned to it the zero or one of a binary coding system.

Figure 3B:
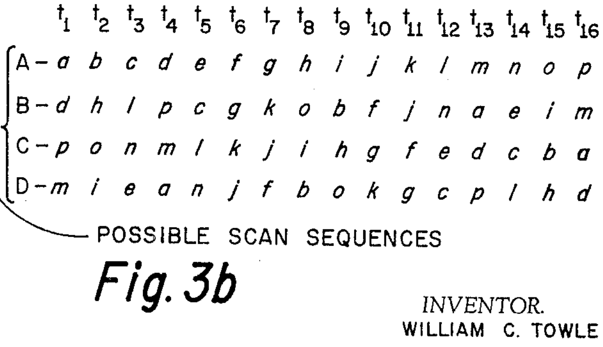
FIG. 3B is a schedule of the different possible sequences in which the elemental areas of the information field of FIG. 3A may be scanned.

FIG. 3B demonstrates the four possible sequences in which the information *a–p* will be found in the output of the scanner 18, depending upon whether the scanner is reading from left to right (A), top to bottom (B), right to left (C), or bottom to top (D) with respect to the information field 32.

The sixteen (*a–p*) elemental areas of the information field 32 are read sequentially in successive periods of time $t_1$–$t_{16}$. FIG. 3B demonstrates that in an A scan the elemental area *a* will be read at time $t_1$, the elemental area *b* at time $t_2$, etc., until the elemental area *p* is read at time $t_{16}$. It will be assumed for the purpose of this description that this is the preferred sequence of data for input to the decoding and output equipment 30. If, however, the information field and scanning reader should become rotated with respect to each other in what might be represented as a 90° turn to the left of the FIG. 3A, a B scan will result and the information content of the elemental areas will be transduced in the sequence shown opposite the designation B in FIG. 3B. Thus, at time $t_1$ the area *d* will be scanned, at $t_2$ the area *h*, etc. Similarly, if the relative positions of the scanner 18 and the information field 32 are further rotated, C and D scans will result.

Thus, the sixteen elemental subdivisions of the information field 32 in FIG. 3A have been designated with the characters *a–p* to establish their identity, and have also each been given a designation A, B, C, and D with an appropriate subscript 1–16 to designate the time ($t_1$–$t_{16}$) at which their information is transduced in A, B, C, or D scans, respectively.

The rearranger 24 which processes the data transduced from these coded areas is organized as follows.

Each shifting register 26 has as many stages as there are possible scanning directions (*A–D*) for the information field 32 and the number of registers corresponds to the total number of elemental information areas (sixteen in the example given) divided by the number of possible scanning approaches. Thus, for the sixteen element field 32 of FIG. 3A the rearranger 24 of FIG. 2 is comprised of sixteen divided by four, i.e. a net of four, shifting registers of four stages each.

Figures 6, 7, 8:
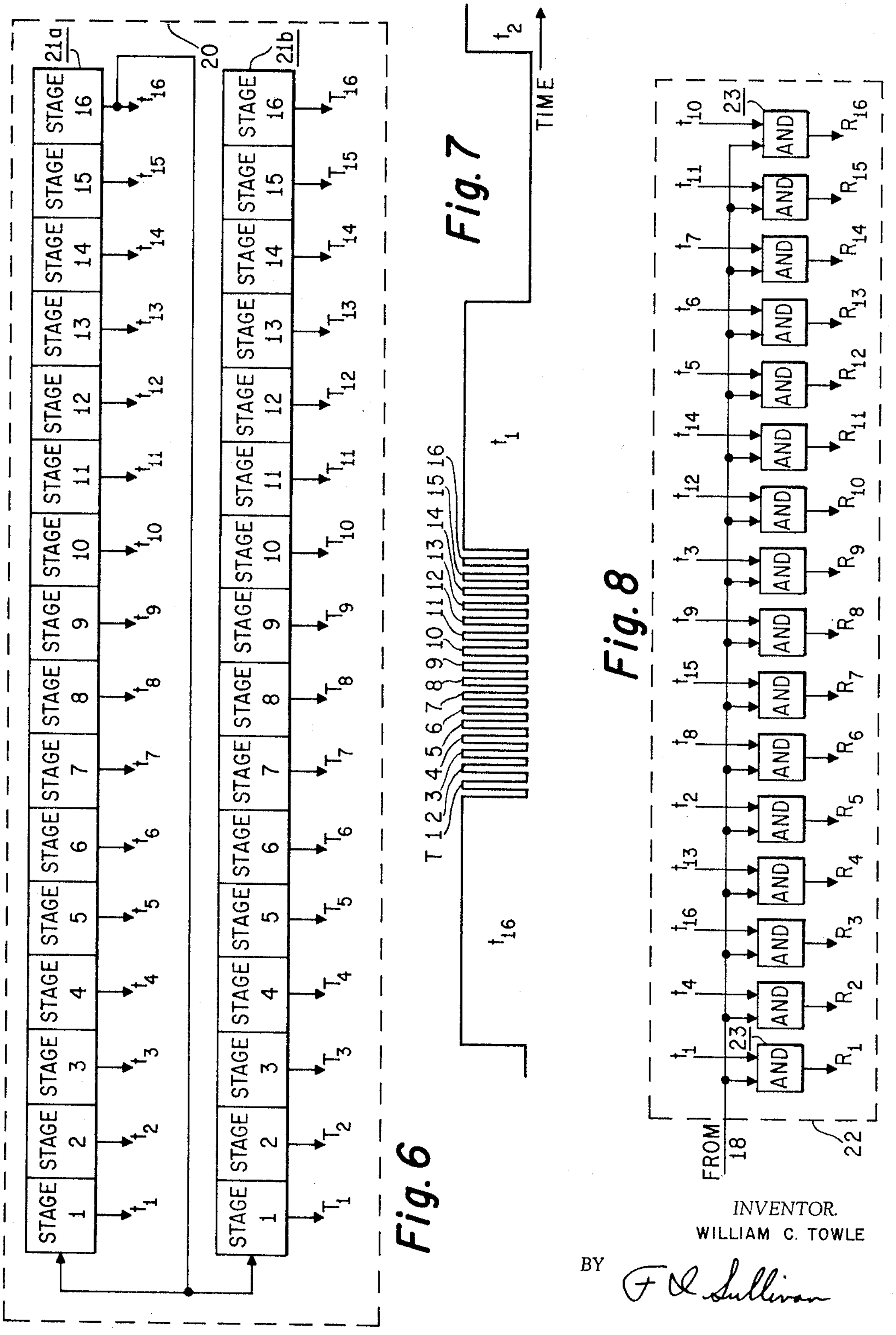
FIG. 6 is a diagrammatic representation of synchronizer 20.
FIG. 7 is a diagrammatic representation of the relationship between $t$ time and T time.
FIG. 8 is a diagrammatic representation of gating and control network 22.

The function of the gating and control network 22 is to connect the output of the scanner 18 to a different one of the inputs $R_1$–$R_{16}$ of the different registers 26 for each different moment of time $t_1$–$t_{16}$, i.e. each step in the operating cycle. This network, shown in FIG. 8, comprises sixteen AND gates 23 each having one input connected to an individual *t* output of synchronizer 20 and the other to a bus which carries serial information from scanner 18. Thus, an AND gate is activated by the coincidence of its *t* timing signal and the information bit corresponding in time with it so that this bit is transferred out via the R output to the associated flip-flop 25 of the rearranger

24. (See FIG. 9.) Close-examination of the $R_{1\text{-}16}$ and $t_{1\text{-}16}$ combinations in FIG. 2 reveals that the pattern of the connections is somewhat intricate. It is based upon the following rationale.

At the $t_1$ the reader will be scanning the area *a* if an A scan is involved. Consequently, the gating and control subsystem 22 connects the scanner 18 to the input $R_1$ of the first stage of the first shift register $26_a$ at this first step in the A scanning cycle. Since there are three other possible first areas to be scanned (*d, p* and *m*) in keeping with the three other scanning directions (B, C, and D), and all four of these areas are scanned as either the first, fourth, thirteenth or sixteenth element in each of the four scans A–D, the inputs $R_2$–$R_4$ of the remaining three stages of the first register $26_a$ are connected to the scanner at times $t_4$, $t_{13}$, and $t_{16}$, respectively. Thus for every scan the contents of this register is the same data (*a, d, p* and *m*) in one of the four possible combinations shown in FIG. 3C depending upon whether it was scanned in the A, B, C or D directions, and shifting the contents of the register with feedback connection from the last to the first stage will arrange the data as though it had been scanned in any one desired of the four possible directions.

Similarly, the possible second digit areas of each scan (*b, h, o* and *i*) are assigned to the second shift register $26_b$, the third areas (*c, l, n* and *e*) to the third register $26_c$, and the fourth areas (*f, g, k* and *j*) to the fourth register $26_d$.

In the illustrative example of FIG. 3A the elemental areas *f, g, k* and *j* are shown shaded. This is to indicate that they are the "control bits" previously mentioned. If these areas are given definite code designations such as $f=0$, $g=1$ $k=1$ and $j=0$, one of the four possible digit sequences shown in FIG. 3D is inserted into the fourth shift register $26_d$, depending upon whether the areas concerned are scanned in the A, B, C, or D direction. Examination will reveal that the four sequences shown are shifted versions of each other, and that other initial code inputs will also satisfy this requirement, viz. that the binary "word" comprised by the four control bits occur only once in each of the four possible shifted versions of itself. As a practical matter, only three of the four digits need be used for the control bit code and the fourth can be reserved for other purposes.

Also, although the four center elemental areas of the information field which are gated to the fourth shift register $26_d$ have been selected for this illustration, other areas (e.g. the four corners) gated to one of the other registers could be used for the control bits of the rearranging operation which will now be described in more detail.

As explained previously, the scanner 18 transduces the marks *a–p* in the information field 32 to a series of electrical signals. The scanning operation is controlled by stepping signals from the synchronizer 20 which may contain a crystal controlled oscillator (not shown) operating a sixteen stage ring counter $21_a$ of FIG. 6 establishing a central clock time for the overall system or any other convenient type of central control and synchronizing device which is capable of poviding the timing pulses $t_1$–$t_{16}$ which define the sequential steps in the operating cycle of the equipment. A higher frequency oscillator (not shown) and a second ring counter $21_b$ of FIG. 6 may also be provided to generate timing pulses $T_1$–$T_{16}$ in order to enable orientator 28 to operate properly. The trailing edge of $t_{16}$ from counter $21_a$ initiates counting in counter $21_b$ causing it to generate sixteen T timing pulses before $t_1$ begins. (See FIG 7.)

The particular sequence in which the data content of the elemental areas *a–p* will be presented to the gating and control circuit 22 will be one of the four set forth in the schedule of FIG. 3B, depending upon whether the scanning direction is A, B, C or D. No matter which of the four sequences is involved, the first data to arrive at $t_1$ will be gated to the input $R_1$ of the first stage of the first shifting register $26_a$. At $t_2$ the second digit of the signal train, i.e. the data trandsuced from the second elemental area, is connected to the input $R_5$ of the first stage of the second shift register $26_b$, etc. As shown in FIG. 2, there is a specific connection from the gating and control circuit 22 for each one of the steps $t_1$–$t_{16}$ of the operating cycle to a specific stage of one of the shift registers 26. These specific connections result in each of the four possible first digits of the four possible sequences A–D being stored in the first shifting register $26_a$, the possible second digits in the second register $26_b$, the possible third digits in the third register $26_c$, and the possible fourth digits in the fourth register $26_d$. The result is a storage of one of the possible signal sequences of FIG. 3C in the rearranger 24.

We have assumed in this explanation that the decoding and output equipment 30 requires an input of data scanned in direction A. After the final scanned digit has been stored at time $t_{16}$ the orientator 28, senses the contents of the fourth register $26_d$ which contains the control bits *f*, *g*, *k* and *j*. If the code previously suggested has been employed for these bits in the information field 32 and an A scan has been performed, the orientator will sense the following sequence of digits 0110, whereupon it will actuate control gates connecting the contents of the other registers $26_{a-c}$ to the decoding and output subsystem 30.

Figure 9:
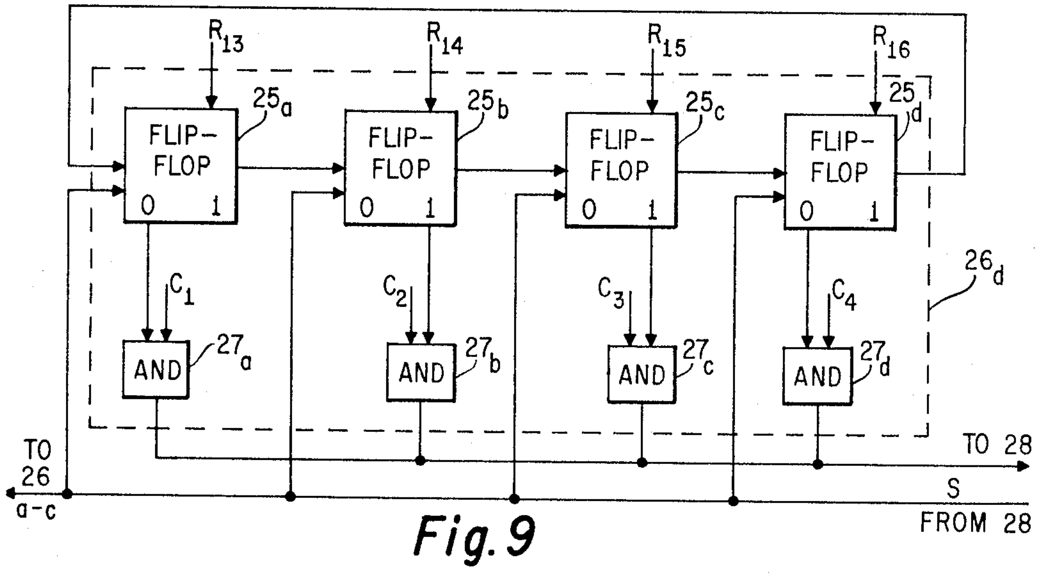
FIG. 9 is a diagrammatic representation of the shift register $\mathbf{26_d}$ in the rearranger 24; and, FIG. 10 is a diagrammatic representation of orientator 28.

One means by which this may be accomplished will now be explained with reference to FIGS. 9 and 10. Register $26_d$, shown in FIG. 9, comprises four flip-flop stages $25_{a-d}$ which store the control bits *f*, *g*, *k* and *j* and four corresponding AND gates $27_{a-d}$ for transferring selected output conditions of these stages 25 to orientator 28 when it senses these gates 27 with C pulses. The generation of these pulses will be described below; briefly, they are timing pulses corresponding in time to the T pulses. Hence, AND gates $27_{a-d}$ are enabled in consecutive order and the contents of flip-flop 25 are transferred in serial form to orientator 28. Note that this sequence of digits will be 1111 if the correct code (i.e. 0110) were stored in register $26_d$ because the reset and not the set side of stages $25_a$ and $25_d$ are connected to AND gates $27_a$ and $27_d$, respectively. Should the sequence be found incorrect, orientator 28 sends a shift signal back to registers $26_{a-d}$ causing a transfer of the condition in each flip-flop 25 to the next succeeding stage with an end around carry from $25_d$ to $25_a$.

Figure 10:
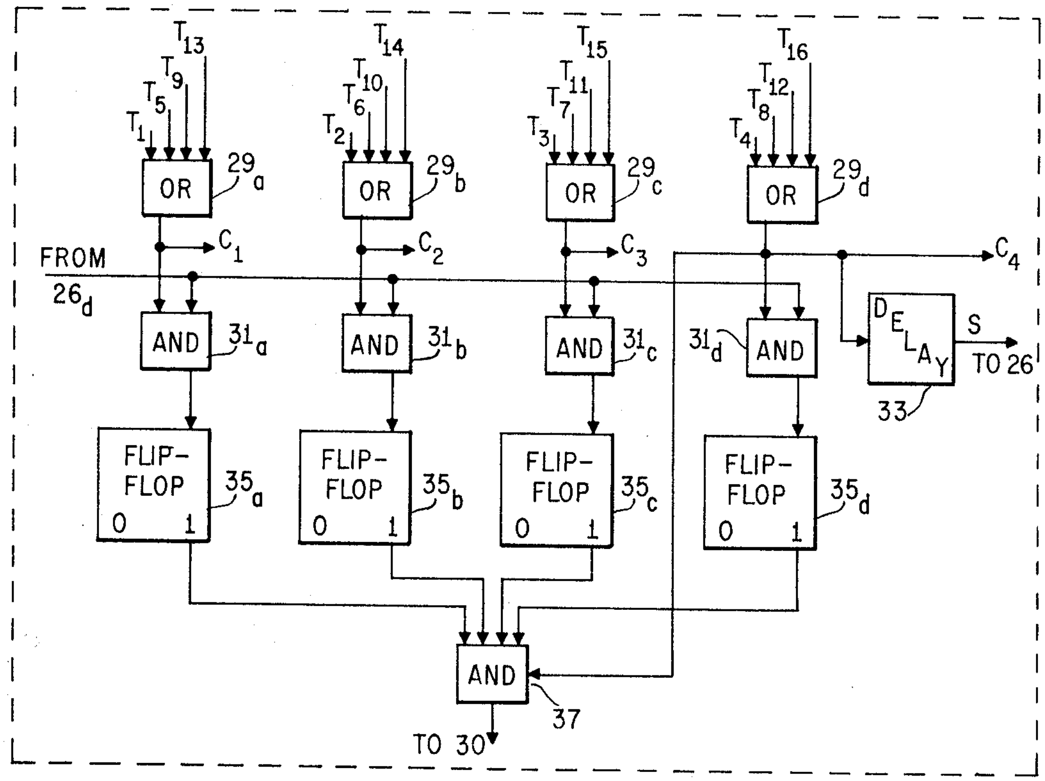

Orientator 28, shown in FIG. 10, comprises OR gates $29_{a-d}$, AND gates $31_{a-d}$ and 37, delay circuit 33, and flip-flop $35_{a-d}$. Between the end of $t_{16}$ and the beginning of $t_1$ it receives timing pulses $T_1$–$T_{16}$ from synchronizer 20. At time $T_1$, OR gate $29_a$ emits a $C_1$ signal which is sent to AND gate $27_a$ of FIG. 9 and $31_a$ of FIG. 10. Consequently, the reset condition of flip-flop $25_a$ in FIG. 9 is transferred through AND gate $27_a$, over the serial bus to orientator 28, through AND gate $31_a$, and is set into flip-flop $35_a$. In like manner flip-flop $35_b$ is set at $T_2$, flip-flop $35_c$ at $T_3$, and flip-flop $35_d$ at $T_4$ providing the code 0110 was stored in stages $25_{a-d}$ of FIG. 9 and four ONE's are transferred to AND gate 37 which is enabled only during $C_4$. A signal from this gate 37 is then sent to the decoding and utilizing equipment 30 allowing it to receive the data content of registers $26_{a-c}$. Delay circuit 33 acts so as to delay $C_4$ long enough to let this action occur and later sends a shift signal S to registers $26_{a-d}$.

If the contents of the rearranger 24 have followed the sequence of B, C, or D scans, the orientator 28 after its attempted comparison will transmit a shift pulse to each of the registers 26 causing them to shift their data content one stage to the right with the data in the final stages being fed back to their respective first stages. This process is continued through the various shifted sequences shown in FIGS. 3C and 3D until the desired A sequence of digits is obtained and the contents of the rearranger is gated to the decoding and output equipment 30. Timing pulses $T_5$–$T_8$, $T_9$–$T_{12}$, and $T_{13}$–$T_{16}$ are available for this purpose at the inputs to OR gates 29.

The operation of the rearranger 24 has been shown and described as it would cooperate with a scanned information field following the 4 x 4 matrix and the possible scanning directions A, B, C, and D shown in FIG. 3A. Numerous other types of information field and scanning directions are possible. Rearrangement of their data will follow the same basic principles with the number of shift registers 26, the number of stages within each register, and the specific connections to these various stages at times $t_1$, etc. being accommodated to the configuration of the substitute information field, the number and direction of scans involved, etc.

FIGS. 4A–C and 5A–C show two of these other possible scanning techniques. In FIG. 4A a diagonal scan of a substantially rectangular matrix is suggested. Here, the information content is represented by thirteen possible bits (*a–m*) which may be scanned in any one of four possible diagonal directions. Consequently, the shift registers in the rearranger will still each have four stages (corresponding to the four possible directions of scan) and a total of three registers will accommodate the entire data sequence, with one bit *g* left over. This bit is stored in a separate flip-flop and not shifted with the rest of the data since it is found at the center of each of the possible scan sequences, i.e. the seventh area of the thirteen to be transduced.

The information field of FIG. 5A is arranged in a triangular configuration with three possible scans. Consequently, its rearranger is comprised of three shift registers having three stages each and one surplus bit *e* which corresponds to the fifth area scanned in each of the three directions A, B, and C.

Other configurations of the code information field are possible; and the rearranging technique described is applicable to various types of mark sensing equipments. Hence, the invention is not limited to the specific information sequences or data processing system described but has utility wherever data sensible by optical, mechanical, or other means is transduced to electrical signals which must be arranged to a proper sequence for decoding or utilization purposes and it is to be accorded the full scope of the following claims.

What is claimed is:

1. In a data processing system wherein an item coded with sensible marks serves as a system input: means for scanning said marks and transducing them to discrete electrical signals; signal gating and control means for arranging said signals into two or more separate groups; two or more pulse shifting registers each having a plurality of stages and a feedback connection from its final to its first stage; means for analyzing the signal content of one of said registers; and, means for shifting the contents of all of said registers in response to said signal analysis.

2. For a mark sensing data processing system: means for scanning sensible marks and transducing them to discrete electrical signals; signal gating and control means for arranging said signals into two or more separate groups; two or more pulse shifting registers each having a plurality of stages and a feedback connection from its final to its first stage; means for analyzing the signal content of one of said registers in response to said signal analysis; one or more system output devices; and, means controlled by said analyzing means for connecting the contents of said registers to said output devices.

3. In a data processing system: an item coded with sensible marks arranged in rows and columns; means for independently scanning each of said marks and transducing them to discrete electrical signals; signal gating and control means for arranging said signals into two or more separate groups; two or more pulse shifting registers each having a plurality of stages and a feedback connection from its final to its first stage; means for analyzing the signal content of one of said registers; and, means for shifting the contents of all of said registers in response to said signal analysis.

4. In an electronic data processing system a signal rearranger which comprises: a source of signal pulses; a plurality of multistage pulse shifting registers each having a feedback connection from its final to its initial stage; time synchronized gating and control circuit means connecting said source to different stages of different ones of said registers at different times; a signal comparison circuit connected to one of said registers; and, means controlled by said signal comparison circuit for parallel shifting of the contents of all of said registers.

5. In an electronic data processing system: a source of signal pulses; a plurality of multistage pulse shifting registers each having a feedback connection from its final to its initial stage; time synchronized gating and control circuit means connecting said source to different stages of different ones of said registers at different times; a signal comparison circuit connected to one of said registers; and, means controlled by said signal comparison circuit for parallel shifting of the contents of all of said registers.

6. In an electronic data processing system wherein sensible marks are transduced to electrical signals for operating one or more output devices, a signal rearranger which comprises: a scanner for serially transducing said marks to signals; a plurality of multistage pulse shifting registers each having a feedback connection from its final to its initial stage; time synchronized gating and control circuit means connecting said scanner to different stages of different ones of said registers at different times; a signal comparison device connected to one of said registers; means controlled by said signal comparison device for parallel shifting of the contents of all of said registers; one or more output devices; and, means responsive to said signal comparison device for connecting the contents of said registers to said output devices.

7. An electronic mark sensing system which includes: a scanner adapted to transduce sensed marks to electric signals; a plurality of multistage pulse shifting registers each having a feedback connection from its final to its initial stage; a gating and control subsystem synchronized to connect said scanner to the various stages of said registers in a given sequence: decoding and utilizing equipment connected to said registers; and, a shift control for said registers, said shift control being responsive to the signal content of one of said registers.

8. For a data processing system in which a scanner may sense a plurality of sensible marks from a number of different directions, a data rearranger comprising: a plurality of multistage pulse shifting registers each having a feedback connection from its final to its initial stage; a gating and control subsystem synchronized to connect said scanner to the various stages of said registers in a given sequence; decoding and utilizing equipment connected to said registers; and, a shift control for said registers, said shift control being responsive to the signal content of one of said registers.

9. For a data processing system in which a scanner may sense a plurality of sensible marks in a number of different directions to transduce sensible data to electric signals in a corresponding number of different sequences, a data rearranger which comprises: a plurality of pulse shifting registers each having a number of stages equal to the number of said directions and a feedback connection from its final to its initial stage; a gating and control subsystem synchronized to connect said scanner to the various stages of said registers in a given sequence; decoding and utilizing equipment connected to said registers; and, a shift control for said registers, said shift control being responsive to the signal content of one of said registers.

10. For an electronic data processing system, a serial to parallel converter comprising: a source of data signals in serial pulse format; a plurality of pulse shifting registers, each having a feedback signal transfer connection from its final to its initial stage; means for processing individual ones of said serial pulses into corresponding individual stages of said registers; a plurality of signal output circuits each connected to a corresponding different one of said individual stages; means for parallel shifting of the data content of said registers; a data content decoding device connected to one of said registers; and, means responsive to the data content of one of said registers for controlling the transfer of data from said individual stages of said registers to said output circuits.

11. Data processing equipment comprising: a plurality of pulse shifting registers, each having a signal transfer connection from its final to its initial stage; means for parallel pulse shifting operation of said registers; means for utilizing the combined data content of said registers; means for decoding the data content of a given one of said registers after different ones of said pulse shifting operations; and, means controlled by said decoding to control said utilizing means.

No references cited.

ROBERT C. BAILEY, *Primary Examiner.*

G. SHAW, *Assistant Examiner.*